United States Patent [19]

Sueoka

[11] Patent Number: 5,612,375
[45] Date of Patent: Mar. 18, 1997

[54] CREATINE BEVERAGE AND PRODUCING PROCESS THEREOF

[76] Inventor: Haruhiko Sueoka, 9-11-204, Kamata 3-Chome, Setagaya-Ku, Tokyo, Japan

[21] Appl. No.: 583,963

[22] Filed: Jan. 11, 1996

Related U.S. Application Data

[63] Continuation of Ser. No. 383,007, Feb. 3, 1995, abandoned.

[30] Foreign Application Priority Data

Feb. 28, 1994 [JP] Japan ................................ 6-052657

[51] Int. Cl.$^6$ ................................................ A61K 31/195
[52] U.S. Cl. ................................................ 514/565
[58] Field of Search ................................ 514/565, 23; 424/682

[56] References Cited

U.S. PATENT DOCUMENTS 3,988,483  10/1976  Deyoe et al. ............................ 426/53
5,397,786  3/1995  Simone ................................ 514/300

FOREIGN PATENT DOCUMENTS 1578691  8/1969  France.
9402127  2/1994  WIPO.

OTHER PUBLICATIONS

Derwent Abstract of French Patent No. 1578691. 1969.

*Primary Examiner*—Raymond Henley, III
*Attorney, Agent, or Firm*—Richard Linn

[57] ABSTRACT

To provide a process for producing a healthy or nutritious beverage comprising creatine as a main ingredient, in which the effect of creatine is not lost during preservation, and the beverage can be prepared at low cost. A process for producing a creatine beverage comprising the steps of: healing water rendered weakly alkaline; adding from 1 to 3 grams per 100 cc of the healed water, of crystalline creatine powder to the heated water; dissolving the creatine powder by stirring to form a creatine aqueous solution; and adding an additive to the creatine aqueous solution for improving nutrition or palatability, and sterilizing the creatine aqueous solution to obtain a creatine beverage having a pH value of 7 to 10.

13 Claims, No Drawings

CREATINE BEVERAGE AND PRODUCING PROCESS THEREOF

This application is a continuation of application Ser. No. 08/383,007 filed Feb. 3, 1995 now abandoned.

BACKGROUND OF THE INVENTION

1. Field of the Invention

The present invention relates to a healthy, an energetic or a nutritious beverage containing creatine as a main ingredient and a process for producing a creatine beverage.

2. Description of the Prior Art

The demand of bottled or canned beverages has been rapidly increasing with the spread of vending machines. Further, water pollution has promoted the extension of the kinds of these beverages from conventional carbonized drink and fruit juice to mineral water, natural water and healthy or nutritious drinks. Above all, healthy drinks are expected to enjoy demand as new popular merchandise depending on the choice and effects of the ingredients.

Whether such demand is met depends on the choice of an active ingredient and the preparation for enhancing the effect of the active ingredient. The beverages to be sold in quantities on the vending machines should be produced at low cost. Further, the ingredients should have stable quality during delivery.

On the other hand, the International Olympic Committee (IOC) prohibits players from taking drugs habitually to increase their physical ability artificially. The list of the drugs prohibited by IOC covers more than 120 kinds. Creatine is one of the amino acids biosynthesized in vertebrates. Ninety-five to ninety-eight % of the creatine in a body is present in muscles, serving to accelerate rapid energy transport in the muscular cells. A high creatine content in skeletal muscles is important for continuation of exercise and postpones the time at which the muscles are felt fatigued. Similarly, the creatine in heart muscles acts to prevent myocardial fatigue in any situation that imposes stress on the heart. The creatine is not included in the list of the drugs prohibited by IOC. In the Barcelona Olympics, much attention was focused on the result that two of the English track and field players who took the creatine won the championship, one in the men's 100-meter final and the other in the women's 400-meter final.

Since the creatine is present in muscles (about 4 grams per K-gram of fresh muscles), a human body can be supplied with the creatine by meat intake. However, it is costly to take a large quantity of the meat for assuring a requisite supply of the creatine. Besides, the creatine content of the meat tends to decrease with a time during storage of the meat or a heating on cooking. Therefore, in a case where the muscles should be developed in a short time as demanded by athletics, it has been a practice to take a creatine solution prepared by dissolving a creatine tablet or powder weighing 1 to 3 grams in moderately warmed water by stirring within 10 minutes from the preparation twice a day. However, since the creatine in a neutral aqueous solution turns into creatinine, which has no function in muscular cells and is excreted in the urine, a creatine aqueous solution does not keep long and will lose its effect unless taken immediately after the preparation.

SUMMARY OF THE INVENTION

The present invention has been completed in the light of the above-mentioned circumstances. An object of the present invention is to provide a healthy beverage comprising creatine as a main ingredient which does not lose the effect of creatine during preservation and which can be prepared at low cost. Another object of the present invention is to provide a process for producing a creatine beverage in a stable state that does not change into creatinine and can be effectively used as a healthy, an energetic or a nutritious beverage.

According to one aspect of the present invention, for achieving the objects described above, there is provided a creatine beverage which is produced by the steps of: heating water rendered weakly alkaline; adding from 1 to 3 grams per 100 cc of the heated water, of crystalline creatine powder to the heated water; dissolving the creatine powder by stirring to form a creatine aqueous solution; and adding an additive to the creatine aqueous solution for improving nutrition or palatability, and sterilizing the creatine aqueous solution to obtain a sterilized creatine drink having a pH value of 7 to 10.

According to another aspect of the present invention, there is provided a process for producing a creatine beverage comprising the steps of: heating water rendered weakly alkaline; adding from 1 to 3 grams per 100 cc of the healed water, of crystalline creatine powder to the heated water; dissolving the creatine powder by stirring Lo form a creatine aqueous solution; adding an additive to the creatine aqueous solution for improving nutrition or palatability and sterilizing the creatine aqueous solution to obtain a creatine beverage having a pH value of 7 to 10.

The nature, principle and utility or the invention will become more apparent from the following detailed description when read in conjunction with the accompanying drawings.

DESCRIPTION OF THE PREFERRED EMBODIMENTS

Creatine (N-(Aminoiminomethyl) -N-methylglycine; N-amidinosarcosine: ($\alpha$-methylguanido)acetic acid; N-methyl-N-guanylglycine; methylglycocyamine) has a monoclinic crystal form containing one molecule of crystal water and releases the water molecule at 100° C. to become an anhydrous acid. The creatine in an aqueous solution gradually decomposes with the time to the creatinine under a neutral to acidic condition. Because such decomposition does not take place under an alkaline condition, the creatine in an alkaline aqueous solution can be preserved wiLllout losing its effect.

Larger supply of the creatine by food intake than the upper limit absorbable in muscles is of no use. On the other hand, too small of a supply produces little effect of replenishment. In the present invention, it was decided based on the results of study published to date that the creatine content per container for a single dose fails within a range of from 1.0 to 4.5 grams so as to increase the absorption in the body while avoiding waste of the ingredient and making cost reduction possible. Various additives are added to assist activation of the muscles as nutrition sources or to improve the palatability of the beverage.

The most remarkable part of the characteristics of the creatine is a transition from the creatine to the creatine phosphate by an enzyme named ereaLine kinaye. The creatine of the percentage from 60 to 90% is distributed as the creatine phosphate at a rest. How much PCr (creatine phosphate) is held at a rest depends on how fast (nearly at once) resynthesis of ATP (adenosinetriphosphate) is stored at a contractive exercise of the muscle. The resynthesis power of the ATP holds the key to a continuous exercise, and how much storage of ADP (adenosine diphosphate) that causes outflow of free radical facilitating the cell wall destriction by the contractive exercise of the muscle is put down depends on the PCr quantity in the rest. PCr can be resynthesized from other ATP by fat and carbohydrate oxidation reaction at an intracellular glomerular. The creatine and the PCr assist in carrying energy produced at, the intracellular glomerular to the different area to be able to use. The higher the PCr quantity is the faster resynthesis is, and the contractive fiber holds the quantity of the ATP at a high rate (ADP is little quantity). However, when the resynthesis power by the PCr with the progress of the exciting exercise begins to reach the limit, the ADP quantity gradually increases, disturbs and begins to weaken the muscle (fatigue). The PCr is a high quantity before starting work by supply of the creatine (resynthesis power is high) and if there is a large quantity of the creatine (a state being able to carry amply an energy), staminas increase and recovery power comes to high. Increase of the PCr quantity by supply of the creatine decreases occurrence of acidosis by lactic acid producer at the exciting exercise. ATP's excretion to urea acid diminishes with an increase of the PCr quantity obstructs outflow of free radical and decreases fatigue of the muscle after the exciting exercise.

The process for producing the creatine beverage of the present invention will be explained in greater detail with reference to specific examples. Starting creatine is crystals of a monohydrate of the compound having structural formula shown in the below chemical formula 1. Chemical products, such as "Ergomax C150 (Trademark)", produced by AMS Co. of Yorkshire in England, may be utilized. The products "Ergomax C150" are tablets of solid and the creatine is not dissolved in water. Therefore, in a case of using the products "Ergomax C150", it is necessary to dissolve it in hot water and then drink the dissolved solution. If the tablet ("Ergomax C150") is directly ingested, the creatine in the tablet is changed into the creatinine due to strong acid in a stomach. Therefore, it is impossible to swallow the tablet ("Ergomax C150") as it is and get the desired effort.

Chemical Formula 1

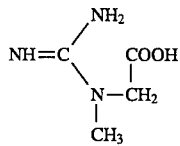

A batch of pure water or distilled water is put in a container, adjusted to a prescribed "pH" between pH 7 and pH 10 with a normal alkali solution, and heated to a temperature of 20° to 99° C. To 100 parts by weight of the warm water is added 1 to 3 parts by weight of the creatine and dissolved by stirring. The "pH" is not particularly limited as long as it is alkaline, but is desirably not higher than pH 9 taking the physiological influences on eye balls and gastrointestinal tracts into consideration.

To the thus prepared creatine aqueous solution are added appropriately fruit sugar, amino acid, mineral, such as calcium and magnesium, and vitamin for improvement of palatability and for supplement of nutrition to obtain a creatine drink. In order to remove bacteria having entered during the preparation thereby to prevent denaturation during storage, the resulting creatine drink is sterilized by passing through a bacterial filler having an opening of 0.2 μm diameter or less. The bacterial filter may be substituted for heating the resulting creatine drink at a temperature of 60° to 105° C. for a predetermined time (for example, 2 seconds). The thus sterilized creatine drink is seated into a 100 to 150 cc-volume bottle or can to obtain a final product. The sterilized creatine drink may be charged into a capsule. A prescribed creatine content of 100 cc preparations or 150 cc preparations is in the range of from 1 to 3 grams and of from 1.5 to 4.5 grams, respectively. Sterilization by heating is accompanied by partial decomposition or denaturation of the ingredient and is not therefore recommended.

As described above, the process for producing a creatine beverage according to the present invention makes it possible to preserve and supply creatine, which dissipates muscular fatigue and helps continuation of exercise, in the form of a stable beverage. The creatine content per container being controlled in agreement with the possible upper limit of absorption per intake, the preparation involves no waste and can be offered at reduced cost. It is possible to further increase the effect of the creatine by taking advantage of various additives added thereto.

TABLE 1

| Example | Creatine (mg/dl) | Creatinine (mg/dl) |
| --- | --- | --- |
| #1 | 430.0 | 221.0 |
| #2 | 490.0 | 280.0 |
| #3 | 730.0 | 73.8 |
| #4 | 690.0 | 66.3 |
| #5 | 890.0 | 23.9 |
| #6 | 940.0 | 26.1 |
| #6' | 940.0 | 60.1 |

The above table 1 shows the effects of the present invention. That is, example #1 is a solution in which the creatine (2 grams) and tartaric acid ($C_4H_6O_6$) (1 gram) are dissolved in water (200 cc) and then the dissolved liquid is warmed up. Example #2 is a solution in which the creatine (2 grams) and the tartaric acid ($C_4H_6O_6$) (2 grams) are dissolved in water (200 cc) and the dissolved liquid is warmed up. As a result of the chemical analysis of the examples #1 and #2, it is clear that the creatine is weak to the acid and easily changed into the creatinine. Examples #3 and #4 are respectively solution in which the creatine (2 grams) is dissolved in water (200 cc) and then the dissolved liquid is warmed up. This result also shows that the creatine is not stable and is easily changed into the creatinine. On the other hand, examples #5 and #6 are solutions in which the creatine (2 grams) is dissolved in water (200 cc) at regulated pH 8.9 state and then the dissolved liquid is warmed up according to the present invention. As a result of the chemical analysis of the examples #5 and #6, it is clear that the conversion of the creatine into the creatinine is restrained. Further, example #6' is solution of the example #5 which is let alone for two months at a temperature.

It should be understood that many modifications and adaptations of the invention will become apparent to those skilled in the art and it is intended to encompass such obvious modifications and changes in the scope of the claims appended hereto.

What is claimed is:

1. A creatine beverage which is produced by a process comprising the steps of:

heating water rendered weakly alkaline;

adding from 1 to 3 grams per 100 cc of the heated water, of crystalline creatine powder to the heated water;

dissolving the creatine powder by stirring to form a creatine aqueous solution;

adding an additive to the creatine aqueous solution for improving nutrition or palatability; and sterilizing the creatine aqueous solution to obtain a creatine drink having a pH value of 7 to 10.

2. A creatine beverage as claimed in claim 1, wherein said process further comprises the step of canning the sterilized drink into a can.

3. A creatine beverage as claimed in claim 1, wherein said process further comprises the step of bottling the sterilized drink into a bottle.

4. A creatine beverage as claimed in claim 1, wherein the water which is rendered weakly alkaline is regulated to have a pH of 7.2 to 10.0 and wherein the pH of the creatine drink has a pH of 7.2 to 10.0.

5. A creatine beverage as claimed in claim 1, wherein the water which is rendered weakly alkaline is regulated to have a pH of about 8.9 and wherein the pH of the creatine drink has a pH of about 8.9.

6. A creatine beverage which is produced by a process comprising the steps of:

heating water rendered weakly alkaline;

adding from 1 to 3 grams per 100 cc of the heated water, of crystalline creatine powder to the heated water;

dissolving the creatine powder by stirring to form a creatine aqueous solution;

adding an additive to the creatine aqueous solution for improving nutrition or palatability, and sterilizing the creatine aqueous solution to obtain a creatine drink having a pH value of 7 to 10; and filling the sterilized creatine drink into a capsule.

7. A creatine beverage which is produced by a process comprising the steps of:

heating water which is regulated to be weakly alkaline and to have a pH of about 8.9;

adding from 1 to 3 grams of crystalline creatine powder per 100 cc to the heated weakly alkaline water;

stirring the weakly alkaline water to dissolve the creatine powder and form an aqueous creatine solution;

adding an additive to the aqueous creatine solution for improving nutrition or palatability, and sterilizing the creatine aqueous solution to obtain a sterile weakly alkaline creatine containing drink having a pH value of about 8.9.

8. A process for producing a creatine beverage comprising the steps of:

heating water rendered weakly alkaline;

adding from 1 to 3 grams per 100 cc of the heated water, of crystalline creatine powder to the heated water;

dissolving the creatine powder by stirring to form a creatine aqueous solution; and adding an additive to the creatine aqueous solution for improving nutrition or palatability; and sterilizing the creatine aqueous solution to obtain a creatine beverage having a pH value of 7 to 10.

9. A process for producing a creatine beverage as claimed in claim 8, wherein said water rendered weakly alkaline is water at pH 7 to 10 heated to a temperature of from 20° to 99° C.

10. A process for producing a creatine beverage as claimed in claim 8, wherein said additive contains at least one of fruit sugars, amino acids, calcium, magnesium, and vitamins.

11. A process for producing a creatine beverage as claimed in claim 8, wherein said sterilization treatment is performed by heating the creatine aqueous solution to a temperature of 60° to 105° C.

12. A process for producing a creatine beverage as claimed in claim 8, wherein said sterilization treatment is performed by using a bacterial filler having an opening of 0.2 μm diameter or less.

13. A process fox producing a creatine beverage as claimed in claim 8 further including the step of charging said creatine drink in a capsule, a can or a bottle.

* * * * *